(12) United States Patent
Misso et al.

(10) Patent No.: US 6,288,879 B1
(45) Date of Patent: Sep. 11, 2001

(54) TOP DOWN ASSEMBLY OF A DISK DRIVE ACTUATOR USING A TOLERANCE RING AND A POST

(75) Inventors: Nigel F. Misso, Bethany; Steve S. Eckerd, Oklahoma City; Daniel M. Heaton, Yukon, all of OK (US)

(73) Assignee: Seagate Technolocy LLC, Scotts Valley, CA (US)

( * ) Notice: Subject to any disclaimer, the term of this patent is extended or adjusted under 35 U.S.C. 154(b) by 0 days.

(21) Appl. No.: 09/406,594

(22) Filed: Sep. 24, 1999

Related U.S. Application Data
(60) Provisional application No. 60/101,796, filed on Sep. 25, 1998, and provisional application No. 60/101,785, filed on Sep. 25, 1998.

(51) Int. Cl.[7] .................................................. G11B 5/55
(52) U.S. Cl. ...................... 360/265.6; 403/372; 384/535
(58) Field of Search ............................. 360/265.2, 264.3, 360/265.6; 403/365, 371, 372; 384/535, 581

(56) References Cited

U.S. PATENT DOCUMENTS

| | | | |
|---|---|---|---|
| 3,838,928 | * | 10/1974 | Blaurock et al. ................. 403/372 |
| 4,289,894 | * | 9/1981 | Rongley ............................ 403/372 |
| 4,790,683 | * | 12/1988 | Cramer, Jr. et al. .............. 403/372 |
| 4,828,423 | * | 5/1989 | Cramer, Jr. et al. .............. 403/372 |
| 4,984,115 | | 1/1991 | Takahashi et al. ............... 360/265.6 |
| 5,146,450 | | 9/1992 | Brooks et al. .................... 369/244 |
| 5,315,465 | * | 5/1994 | Blanks .............................. 360/106 |
| 5,392,178 | | 2/1995 | Nishio et al. ................... 360/99.08 |
| 5,539,597 | * | 7/1996 | Blanks ............................ 360/98.06 |
| 5,548,458 | * | 8/1996 | Pelstring et al. ............... 360/99.08 |
| 5,754,372 | | 5/1998 | Ramsdell et al. ............... 360/265.6 |
| 5,786,963 | | 7/1998 | Malek ............................. 360/264.3 |
| 5,818,665 | | 10/1998 | Malagrino, Jr. et al. ........ 360/265.7 |
| 5,983,485 | * | 11/1999 | Misso .............................. 29/603.03 |
| 6,163,441 | * | 12/2000 | Wood et al. ..................... 360/266.1 |

OTHER PUBLICATIONS

Samsung, Technical Manual, May, 1998 (Rev. B), p. 5–2.

* cited by examiner

Primary Examiner—David Davis
(74) Attorney, Agent, or Firm—Crowe & Dunlevy

(57) ABSTRACT

An apparatus for reducing manufacturing cost and increasing disc drive actuator assembly stiffness. A post extends from a base deck and supports an actuator assembly and cartridge bearing. In particular, the cartridge bearing comprises a stationary shaft, a bearing supported by the shaft, and a sleeve rotatably supported by the bearing for rotation about the stationary shaft. A first tolerance ring is disposed between an inner surface of the shaft and the post to secure the cartridge bearing in place during assembly. A second tolerance ring is interposed between the cartridge bearing and the E-block to secure the E-block.

10 Claims, 7 Drawing Sheets

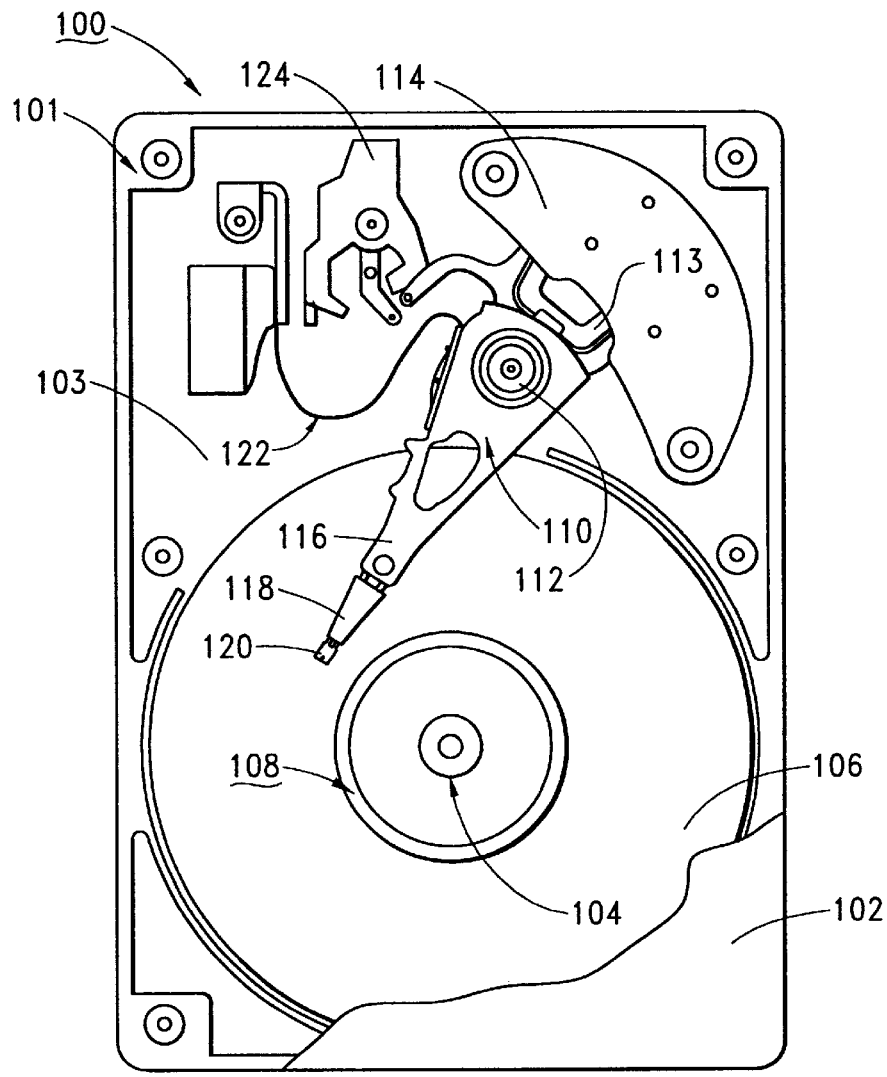
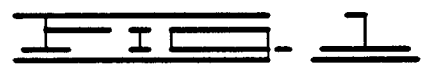
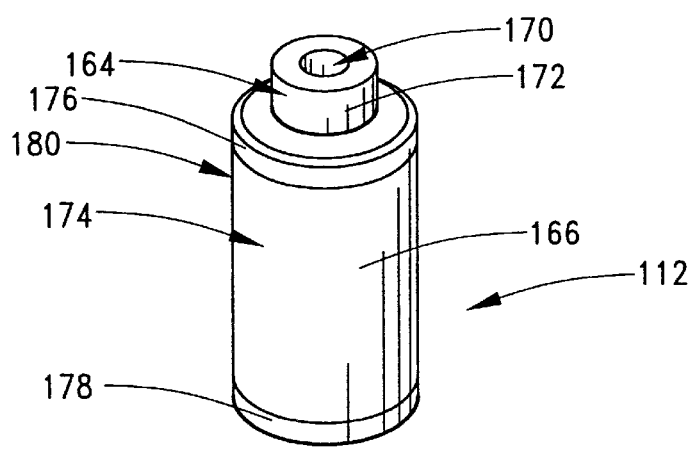
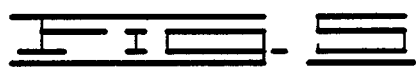

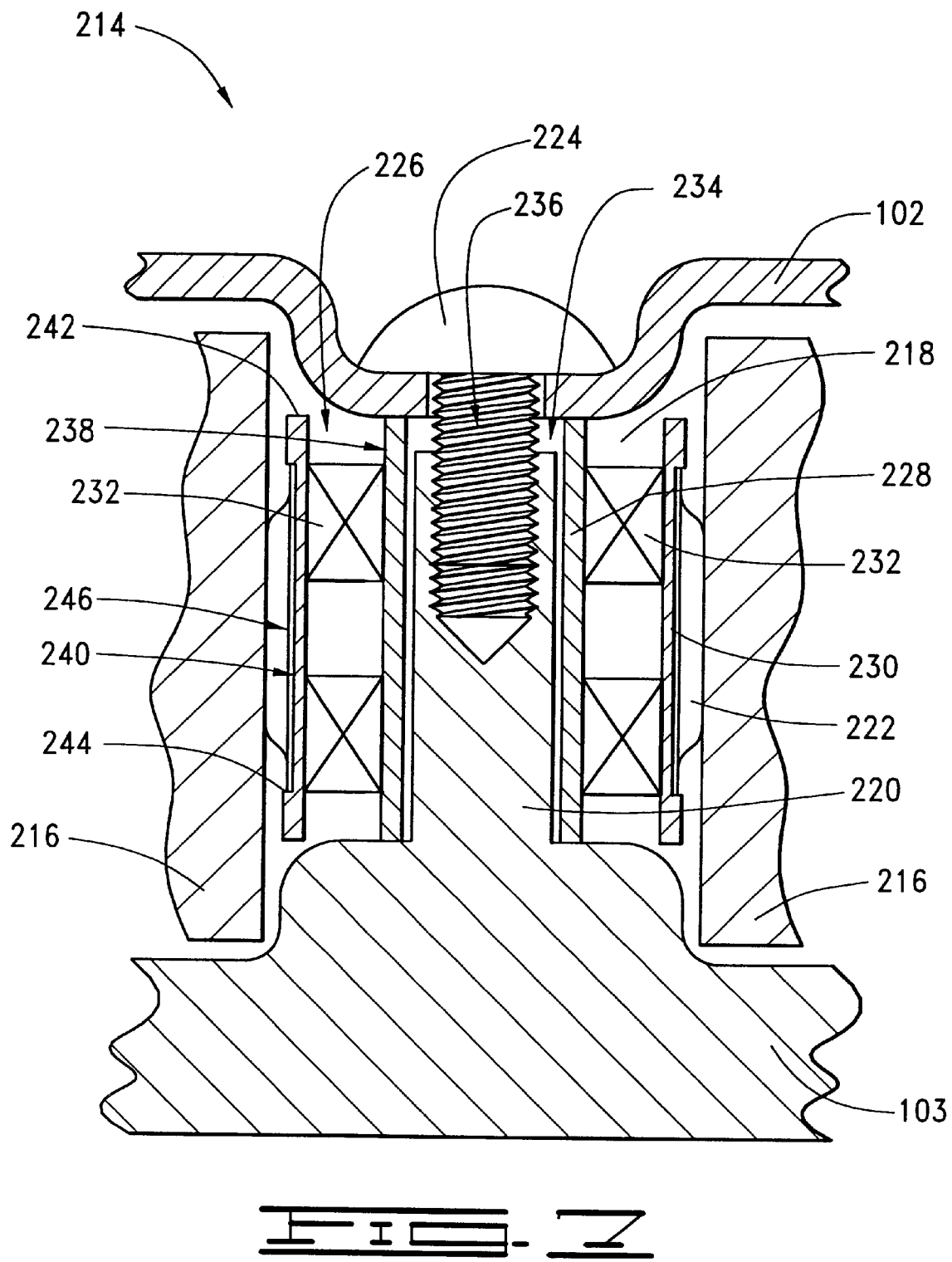

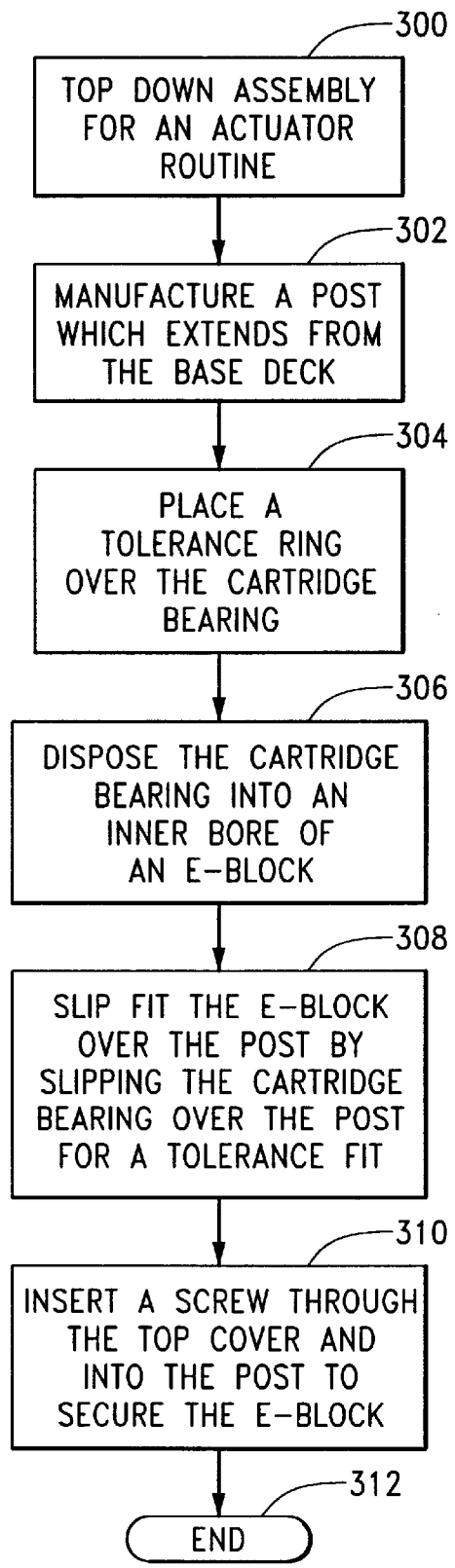
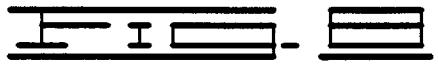

TOP DOWN ASSEMBLY OF A DISK DRIVE ACTUATOR USING A TOLERANCE RING AND A POST

RELATED APPLICATIONS

This application claims the benefit of United States Provisional Application No. 60/101,785 filed Sep. 25, 1998 and United States Provisional Application No. 60/101,796 filed Sep. 25, 1998.

FIELD OF THE INVENTION

This invention relates generally to the field of disc drive data storage devices, and more particularly, but not by way of limitation, to the <Title>.

BACKGROUND OF THE INVENTION

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of permeable pole pieces. When controlled DC current is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

Control of the position of the heads is typically achieved with a closed loop servo system such as disclosed in U.S. Pat. No. 5,262,907 entitled HARD DISC DRIVE WITH IMPROVED SERVO SYSTEM issued Nov. 16, 1993 to Duffy et al. (Duffy '907), and assigned to the assignee of the present invention. A typical servo system utilizes servo information (written to the discs during the disc drive manufacturing process) to detect and control the position of the heads through the generation of a position error signal (PES) which is indicative of the position of the head with respect to a selected track. The PES is generated by the servo system by comparing the relative signal strengths of burst signals generated from precisely located magnetized servo fields in the servo information on the disc surface.

During track following in which a selected head is caused to follow a selected track, a servo processor compares the value of the PES to a desired value indicative of the desired position of the head to the selected track and issues a digital correction signal to the power amplifier, which in turn provides an analog current to the actuator coil to adjust the position of the head with respect to the track. During a seek operation in which a selected head is moved from an initial track to a destination track, relatively large currents are applied to the coil to initially accelerate and then decelerate the head towards the destination track. The velocity of the head is repeatedly measured and the current applied to the coil is adjusted in accordance with the difference between the actual velocity of the head and a velocity profile.

As will be recognized, a continuing trend in the industry is to provide characteristics at an ever decreasing cost. To this end, efforts are continually being undertaken to improve not only disc drive storage and transfer rates, but also manufacturing of the disc drives. Therefore, top down assembly is the ultimate goal in creating low cost disc drives. However, the method by which the actuator assembly has been manufactured in the past has traditionally been expensive and has inhibited top down assembly. Moreover, such prior art methods have provided little stiffness for the actuator during assembly to prevent actuator displacement. In particular, the actuator body is mounted to the shaft by an arrangement of precision ball bearing assemblies. The shaft, precision ball bearings, and a sleeve are commonly referred to as the cartridge bearing. The cartridge bearing is typically attached by means of a screw inserted through the base deck and into the shaft. However, such a method of assembling the cartridge bearing prevents the cost reducing top down assembly.

With continued demand for reduced cost and ever increasing levels of mechanical shock resistance, there remains a continued need for improvements in actuator assembly to prevent actuator slippage during such non-operational shock. It is to such improvements that the present invention is directed.

SUMMARY OF THE INVENTION

The present invention is directed to an the <Title>.

As exemplified by preferred embodiments, a disc drive includes a base deck which supports a spindle motor, a disc connected to the spindle motor for rotation, and a cover which cooperates with the base deck to provide a sealed enclosure. An actuator assembly has an E-block for reading and writing data to the disc. A cartridge bearing is disposed within the actuator assembly to facilitate rotational movement.

A post extends from the base deck and supports the actuator assembly and cartridge bearing. In particular, the cartridge bearing comprises a stationary shaft, a bearing supported by the shaft and a sleeve rotatably supported by the bearing for rotation about the stationary shaft. A first tolerance ring is disposed between an inner surface of the shaft and the post to secure the cartridge bearing in place during assembly. A second tolerance ring is interposed between the cartridge bearing and the E-block to secure the E-block. Together the first tolerance ring, cartridge bearing, second tolerance ring, and E-block are press fitted over the post.

The post extends the entire height of the sleeve to provide greater support for the cartridge bearing, and therefore the actuator assembly. Moreover, the stationary shaft has a top portion which extends beyond the height of the sleeve to allow ease of handling. Finally, once assembly is complete, the cartridge bearing is affixed to the base deck by a screw inserted through the top cover and through an aperture disposed at the top portion of the stationary shaft. The aperture is sized to snugly receive the post so that the screw threadingly engages a corresponding threaded aperture in the post.

In an alternative embodiment, the cartridge bearing is directly slip fitted onto the post with a slip fit pin for ease of manufacture with minimal tooling. Such slip fitting facilitates top down assembly while maintaining rigidity in the cartridge bearing and the E-block during such assembly.

The objects, advantages and features of the present invention will be apparent from the following detailed description when read in conjunction with the drawings and appended claims.

BRIEF DESCRIPTION OF THE DRAWINGS

FIG. 1 is a top view of a disc drive of the type in which the present invention is particularly useful, the disc drive shown with its top cover removed.

FIG. 6 is a flow chart for an ACTUATOR ASSEMBLY routine, generally setting forth preferred steps carried out to assemble the E-block and cartridge bearing to the base deck in the preferred embodiment.

FIG. 7 is a partial cross-sectional view of an alternative embodiment of an actuator assembly of the disc drive of FIG. 1.

FIG. 8 is a flow chart for a TOP DOWN ASSEMBLY FOR AN ACTUATOR, generally setting forth preferred steps carried out to assemble the E-block and cartridge bearing to the base deck in the alternative embodiment.

DETAILED DESCRIPTION

Figure 2:
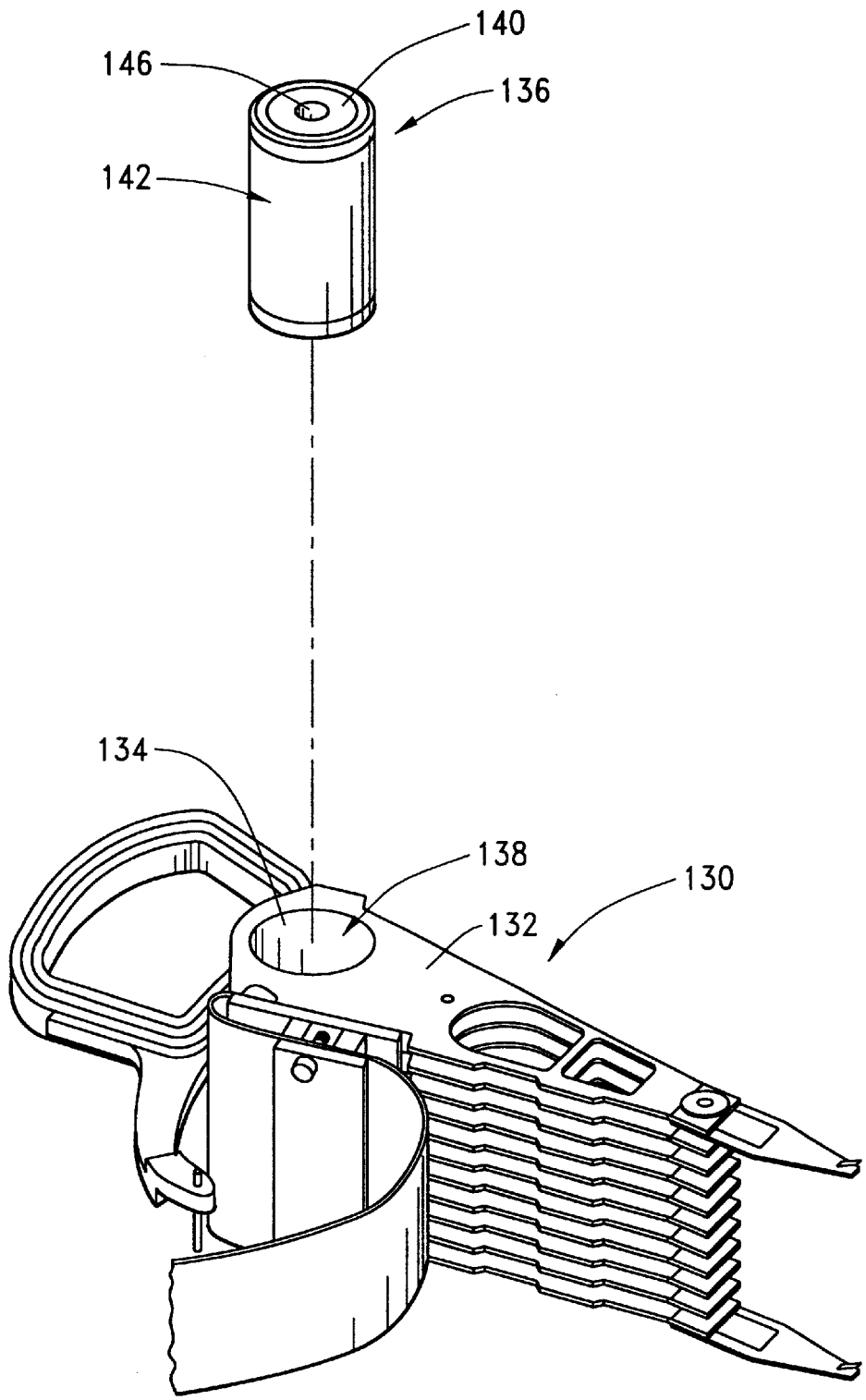
FIG. 2 is an exploded perspective view of a prior art actuator assembly of a disc drive.

A detailed description of various presently preferred embodiments of the present invention will commence with reference to FIG. 1 which shows a disc drive 100 used to store computer data. The disc drive 100 includes a head-disc assembly (HDA) 101 and a printed wiring assembly (PWA) which is mounted to the underside of the HDA. Although not visible in FIG. 1, it will be understood that the PWA is used to control the operation of the HDA 101.

A top cover (a portion of which is shown at 102) mates with a base deck 103 to provide an environmentally controlled environment for the HDA 101. A spindle motor (generally designated at 104) is supported by the base deck 103 and rotates a plurality of axially aligned discs 106 at a constant high speed. A disc clamp 108 is used to clamp the discs 106 relative to the spindle motor 104.

The discs 106 include recording surfaces (not separately identified in FIG. 1) to which user data are written by way of a rotary actuator 110 (also sometimes referred to as the E-block), which rotates about a cartridge bearing 112 in response to the application of current to a coil (113, a portion of which is visible in FIG. 1) of a voice coil motor (VCM) 114. The cartridge bearing 112 will be discussed in further detail below. The actuator 110 includes a plurality of rigid arms 116, each of which supports a corresponding flexible suspension assembly 118. Each suspension assembly 118 in turn supports a head 120 over one of the respective recording surfaces of the discs 106 by an air bearing established by air currents set up by the high speed rotation of the discs 106. It will be noted that the suspension assemblies 118 provide spring forces which urge the heads 120 toward the respective disc surfaces, and the heads 120 are provided with aerodynamic features that fly the heads 120 over the disc surfaces in a highly stable manner.

A flex circuit assembly 122 facilitates electrical interconnection between the actuator 110 and the disc drive PWA. A latch 124 secures the actuator 110 when the disc drive 100 is deactivated, allowing the heads 120 to safely come to rest upon landing zones (not separately identified) located at the innermost radii of the discs 106. The landing zones are preferably texturized to prevent stiction forces from undesirably adhering the heads 120 to the landing zones.

Figure 3:
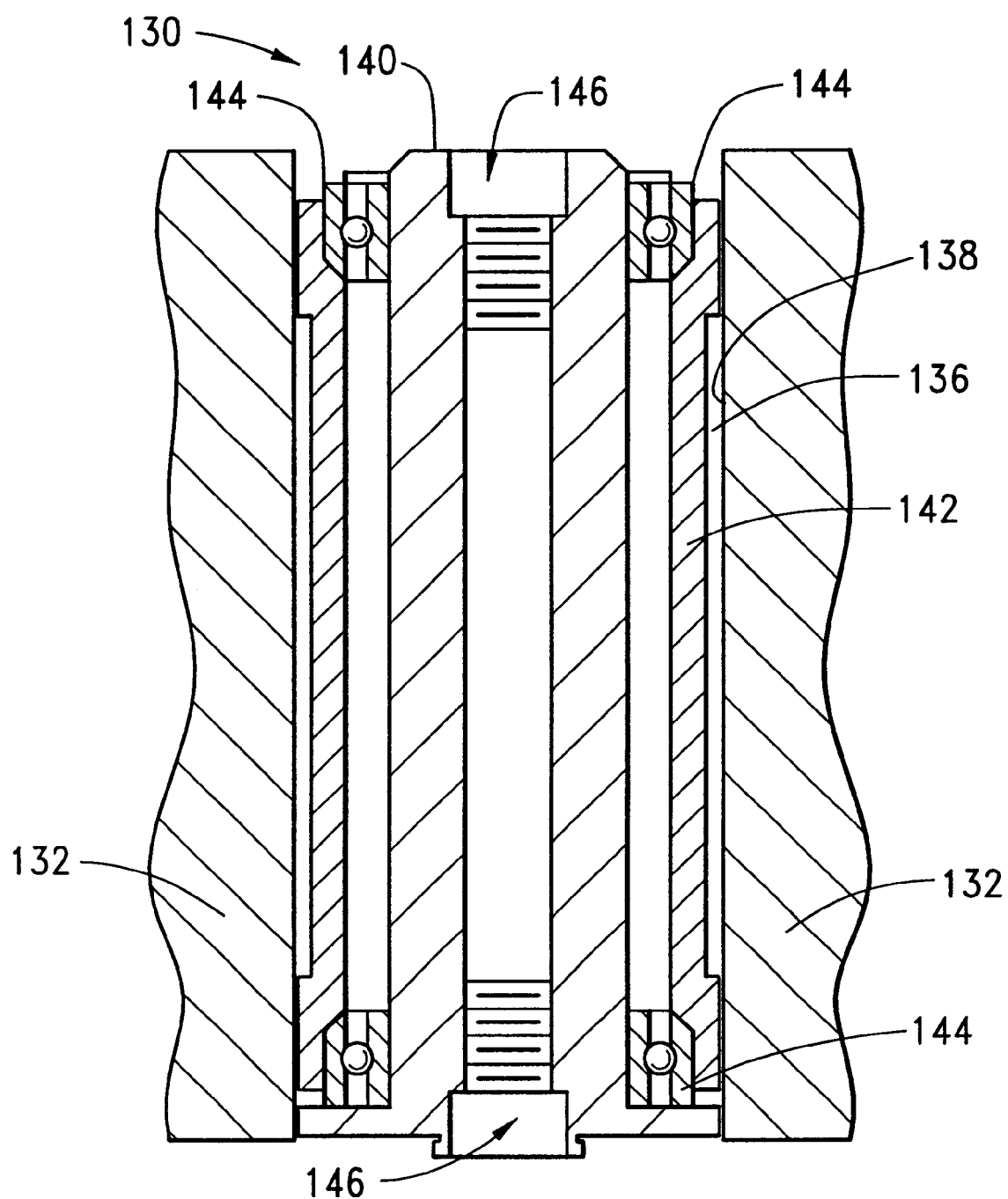
FIG. 3 is a partial cross-sectional view of the prior art actuator assembly of FIG. 2.

To facilitate discussion of the assembly of an actuator assembly, FIG. 2 provides an exploded perspective view of a typical prior art actuator assembly 130. An E-block 132 forms a bore 134 which receivingly engages a cartridge bearing 136 along a bore surface 138. Turning to FIG. 3, the cartridge bearing 136 has a stationary shaft 140 and an outer sleeve 142 separated at upper and lower ends thereof by a pair of ball bearings 144. The stationary shaft 140 has openings 146 on both ends to receive fasteners (not shown) for attachment of the stationary shaft 140 to a base deck (not shown) and to a top cover (not shown). The openings 146 are internally threaded openings to receive screw members. Therefore, in the prior art actuator assembly 130, the stationary shaft 140 is rigidly supported by the base deck and the top cover while the sleeve 142 rotates about the stationary shaft 140.

Since the stationary shaft 140 must be attached by a screw through the top and bottom openings 146, top down assembly cannot be achieved. Therefore, any misalignment or damage to the features of the actuator assembly 130 would require complete disassembly of the actuator assembly 130. Moreover, during assembly, the cartridge bearing 136 and therefore the E-block 132 can be readily displaced as a result of the application of non-operational mechanical shock. In particular, the cartridge bearing 136 and the E-block 132 have relatively low stiffness before insertion of the screws, and therefore translational displacement is highly probable. Such displacement can result in misalignment of the heads and adjacent discs, resulting in track reading and writing error.

Figure 4:
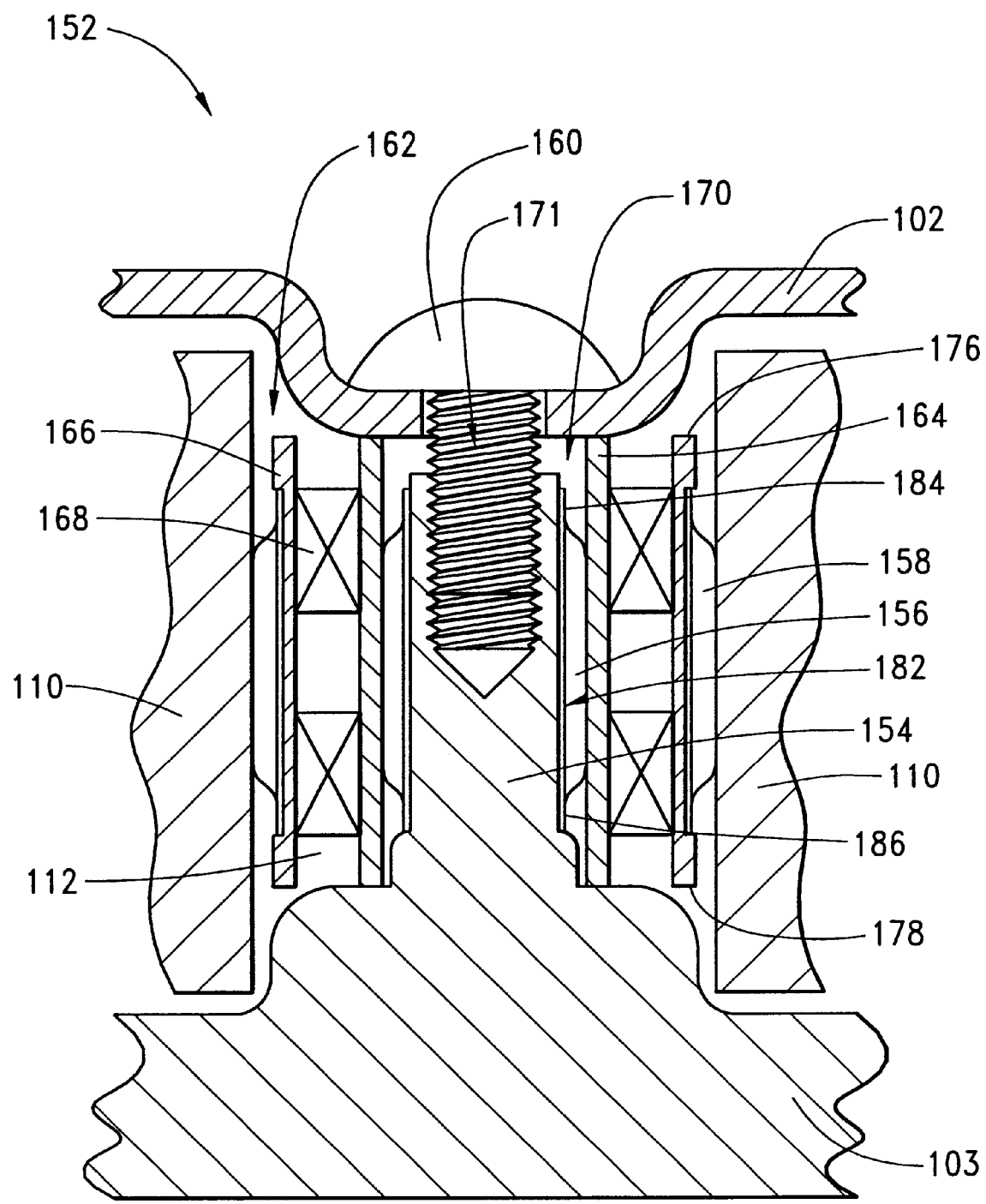
FIG. 4 is a partial cross-sectional view of the actuator assembly of the disc drive of FIG. 1.
Figure 5:
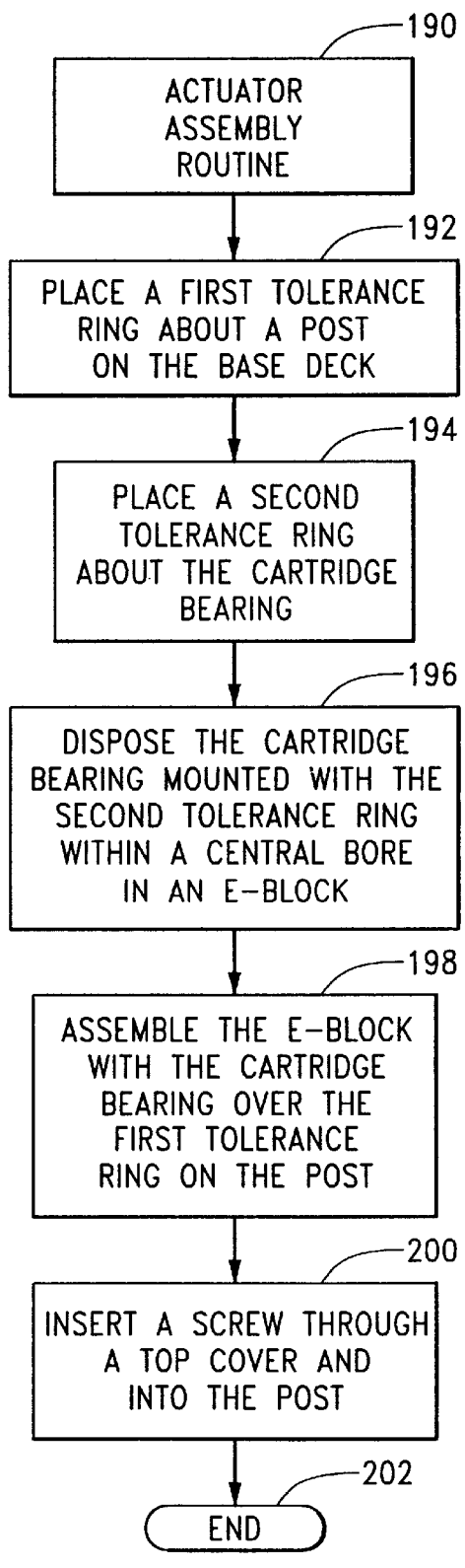
FIG. 5 is a perspective view of the cartridge bearing of the disc drive of FIG. 1.

Accordingly, a preferred embodiment of the present invention is provided. as shown in FIGS. 4–5. Turning now to FIG. 4, shown therein is a cross-sectional, elevational view of a preferred embodiment of the actuator assembly of the present invention. The actuator assembly, generally designated as 152, comprises of the E-block 110, the bearing cartridge 112, a post 154, a first tolerance ring 156, a second tolerance ring 158, and a screw 160.

The E-block 110 has an inner bore 162 for receiving the second tolerance ring 158 and the cartridge bearing 112. The cartridge bearing 112 has a stationary shaft 164 and an outer sleeve 166 separated at upper and lower ends thereof by a pair of ball bearings 168. More specifically, turning to FIG. 5, shown therein is a perspective view of the cartridge bearing 112 of the present invention. The stationary shaft 164 defines an inner bore 170 for receiving the post 154 on the base deck 103. Correspondingly, the post 154 defines a central bore 171 which aligns with an opening (not separately designated) in the top cover. In a preferred embodiment, the central bore 170 is internally threaded to receive the screw 160. Moreover, the stationary shaft 164 has a top portion 172 which extends beyond the extent of the sleeve 166. An outer surface 174 of the cartridge bearing 112 is sized to have a smaller diameter than an inner diameter of the inner bore 162 of the E-block 110. The sleeve 166 forms an upper shoulder 176 and a lower shoulder 178, and a groove 180 of a reduced diameter therebetween the shoulders 176, 178.

Returning to FIG. 4, the first tolerance ring 156 is disposed within the inner bore 170 and about the post 154 to provide stiffness for the cartridge bearing 112 during assembly and before the cartridge bearing 112 is properly secured. The first tolerance ring 156 is made of a compressive material so that the first tolerance ring 156 pressingly engages the inner bore 170 and the shaft 164 to prevent slippage and therefore translational displacement of the cartridge bearing 112 upon application of a non-operational mechanical shock. The first tolerance ring 156 can be any type of tolerance ring and in the preferred embodiment, such first tolerance ring is manufactured by RENCOL, in Bristol, England. Various sizes and shapes of the first tolerance ring 156 are contemplated to be within the scope of the present invention as long as such first tolerance ring 156 provides stiffening for the placement of the cartridge bearing 112 on the post 154.

Continuing with FIG. 4, the second tolerance ring 158 is interposed between the outer sleeve 166 and the E-block 110 to provide stiffness for the E-block 110 during assembly. In particular, the second tolerance ring 158 is seated in the groove 180 created by the upper and lower shoulders, 176, 178, respectively. Preferably, the second tolerance ring 158 has a plurality of projecting corrugations (not shown) so that the corrugations deform against the E-block to provide radial stiffness. The second tolerance ring 158 is of a type such as is manufactured by RENCOL, in Bristol, England.

To describe the masler in which the actuator assembly 152 is assembled through top down assembly, reference is now made to FIG. 6. FIG. 6 provides a flow chart for an ACTUATOR ASSEMBLY routine 190, illustrating the preferred steps utilized to assemble the actuator assembly. Beginning at step 192 in FIG. 6 and with reference to FIG. 4, the first tolerance ring 156 is first placed about the post 154 extending from the base deck of the disc drive. The first tolerance ring 156 settles within a central groove 182 formed by top and bottom shoulders 184, 186, respectively of the post 154. It will be understood that the first tolerance ring 156 is manufactured with the post 154. At step 194, the second tolerance ring 158 is disposed about the cartridge bearing 112. The second tolerance ring 158 is provided over the outer sleeve 166 and is settled within the groove 180.

The cartridge bearing 112 along with the second tolerance ring 158 are then disposed within the inner bore 162 in the E-block 110 at step 196. At step 198, the E-block 110 is then assembled over the first tolerance ring 156 so that the cartridge bearing 112 fits over the first tolerance ring 156. Since the cartridge bearing 112 has an inner bore 170 sized to snugly fit over the first tolerance ring 156 and the post 154, the cartridge bearing 112 is effectively stiffened to prevent translational displacement or slipping during assembly. Moreover, as seen in FIG. 4, the second tolerance ring 158 prevents the E-block 110 from slipping out of place during assembly and during operation. Finally, at step 200, the screw 160 is inserted through the top cover 102 and into the corresponding bore 170 in the E-block 110. The screw 160 is received by the threaded bore 171 in the post 154 for a secure fit. It should be understood by those skilled in the art that various manufacturing steps have not been explicitly disclosed as they are believed to be well known in the industry. The routine then ends at step 200.

In an alternative second preferred embodiment, an actuator assembly 214 is used to provide increased stiffness during assembly as well as to decrease manufacturing costs. It should be noted that the components for the disc drive 100 are nominally identical to the components used for the alternative preferred embodiments, and therefore similar numbers will be used to designate nominally identical features. In particular, FIG. 7 shows a cross-sectional, elevational view of the actuator assembly 214. The actuator assembly 214 comprises of an E-block 216, a cartridge bearing 218, a post 220. a tolerance ring 222, and a screw 224.

The E-block 216 has an inner bore 226 for receiving the tolerance ring 222 and the cartridge bearing 21 8. In turn, the cartridge bearing 218 has a stationary shaft 228 and an outer sleeve 230 separated at upper and lower ends thereof by a pair of ball bearings 232. The stationary shaft 228 defines an inner bore 234 for receiving the post 154 on the base deck 103. The inner bore 234 is sized to snugly slip over the post 220. Correspondingly, the post 220 defines a threaded bore 236 which aligns with an openin(g (not separately designated) in the top cover 102. In the second preferred embodiment, the threaded bore 236 is internally threaded to receive the screw 224. Moreover, the stationary shaft 228 has a top portion 238 which extends beyond the extent of the sleeve 230. An outer surface 240 of the cartridge bearing 112 is sized to have a smaller diameter than an inner diameter of the inner bore 232 of the E-block 216. The sleeve 230 forms an upper shoulder 242 and a lower shoulder 244, and a groove 246 of a reduced diameter therebetween the shoulders 242, 244.

Continuing with FIG. 7, the tolerance ring 222 is interposed between the outer sleeve 230 and the E-block 216 to provide stiffness for the E-block 216 during assembly. In particular, the tolerance ring 222 is seated in the groove 246 created by the upper and lower shoulders, 242, 244, respectively. Preferably, the tolerance ring 222 has a plurality of projecting corrugations (not shown) so that the corrugations deform against the E-block 216 to provide radial stiffness. The tolerance ring 222 is of a type such as is manufactured by RENCOL in Bristol, England.

FIG. 8 provides a flow chart for a TOP DOWN ASSEMBLY FOR AN ACTUATOR routine 300 and provides a description of the top down assembly of a slip fit actuator. Beginning at step 302, with reference to FIG. 7, the post 220 is first manufactured to extend from the base deck 103 and toward the top cover 102. The post 220 extends the full extent of the outer sleeve 230 to provide support for the cartridge bearing 218. The tolerance ring 222 is then placed over the cartridge bearing 218 for a snug fit at step 304 so that the tolerance ring 222 is press fitted on and rests about the groove 246. The cartridge bearing 218 along with the tolerance ring 222 are then disposed within the inner bore 226 of the E-block 216 at step 306 for a tight tolerance fit. The tolerance ring 222 pressingly engages both the cartridge bearing 218 and the E-block 216 to prevent translational displacement upon application of a non-operational mechanical shock.

A slip fit pin (not shown) can then be used to slip fit the E-block 216 over the post 220 so that the cartridge bearing 218 engages the post 220, at step 308. The slip fit pin provides a reference for the bottom of the cartridge bearing 218, and therefore reduces the tooling necessary to affix the cartridge bearing 218 to the base deck 103. Moreover, use of a slip fit pin eliminates the need for a threaded aperture within the cartridge bearing 218 for receiving screws for affixing the cartridge bearing 218 to the base deck 103. Eliminating the need for threaded aperture also decreases the amount of particulates that are created within such apertures. By slip fitting, therefore, the E-block 216, the tolerance ring 222, and the cartridge bearing 218 are secured in place over the post 220 on the base deck 103 during assembly until top down assembly is complete to provide a screw or other fastener for rigid attachment. The cartridge bearing 218 is assembled so that the shaft 228 has an inner diameter that is only slightly larger than an outer diameter of the post 220 so that the inner diameter is only large enough to snugly slip over the post 220, at step 304. The cartridge bearing 218 is made from aluminum while the post 220 of the base deck 103 is a stainless steel material.

Finally, at step 310, a fastener such as a screw 224 is inserted through the top cover 102 and into the threaded bore 236 to rigidly affix the actuator assembly 214 to the disc drive 100. The routine then ends at step 312.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An actuator assembly for attachment on a base deck of a disc drive, comprising:
    an E-block forming a central opening;
    a post extending from the base deck and supporting the E-block;
    a cartridge bearing disposed over the post and within the central opening formed by the E-block, the cartridge bearing comprising:
       a stationary shaft;
       a bearing supported by the shaft;
       a sleeve rotatably supported by the bearing for rotation about the stationary shaft; and
       a first tolerance rind supported by an inner surface of the shaft and disposed between the shaft and the post to secure the cartridge bearing within the central opening.

2. The actuator of claim 1 wherein a second tolerance ring is interposed between the cartridge bearing and the E-block to secure the E-block in place.

3. The actuator of claim 1 wherein the first tolerance ring, is a compressive material so that an inner surface pressingly engages the inner surface of the shaft, and an outer surface engages the post, the inner surface and outer surface forming a plurality of projecting corrugations.

4. The actuator of claim 1 wherein the stationary shaft has a top portion which extends beyond the sleeve to allow ease of handling.

5. The actuator of claim 1 wherein the cartridge bearing is affixed to the disc drive by a screw inserted through an aperture disposed at the top portion of the stationary shaft, the aperture sized to receive the post so that the screw threadingly engages the post.

6. A disc drive having a base deck supporting a spindle motor, a disc connected to the spindle motor for rotation and having a data surface, and a cover which cooperates with the base deck to provide a sealed enclosure, an actuator assembly having an E-block, the disc drive comprising:
    a post extending fron the base deck and supporting the actuator assembly;
    a cartridge bearing supported by the base deck and cover, the cartridge bearing comprising:
       a stationary shaft disposed over the post;
       a bearing supported by the shaft;
       a sleeve rotatably supported by the bearing for rotation about the stationary shaft; and
       a first tolerance ring supported by an inner surface of the shaft and disposed between the shaft and the post to rigidly secure the cartridge bearing;
    a second tolerance ring interposed between the cartridge bearing and the E-block to secure the E-block in place.

7. The disc drive of claim 6 wherein the sleeve has a predetermined height, and wherein the post extends the predetermined height of the sleeve.

8. The disc drive of claim 6 wherein the first tolerance ring is a compressive material so that an inner surface pressingly engages the inner surface of the shaft, and an outer surface engages the post, the inner surface and outer surface forming a plurality of projecting corrugations.

9. The disc drive of claim 7 wherein the stationary shaft has a top portion which extends beyond the predetermined height of the sleeve to allow ease of handling.

10. The disc drive of claim 8 wherein the cartridge bearing is affixed to the disc drive by a screw inserted through the top cover and through an aperture disposed at the top portion of the stationary shaft, the aperture sized to receive the post so that the screw threadincly engages the post.

* * * * *